United States Patent [19]

Tukey et al.

[11] Patent Number: 5,911,140
[45] Date of Patent: Jun. 8, 1999

[54] METHOD OF ORDERING DOCUMENT CLUSTERS GIVEN SOME KNOWLEDGE OF USER INTERESTS

[75] Inventors: John W. Tukey, Princeton, N.J.; Jan O. Pedersen, Palo Alto, Calif.

[73] Assignee: Xerox Corporation, Stamford, Conn.

[21] Appl. No.: 08/572,399

[22] Filed: Dec. 14, 1995

[51] Int. Cl.$^6$ .................................................. G06F 17/30
[52] U.S. Cl. ........................ 707/5; 707/3; 707/7; 707/1
[58] Field of Search .................... 395/605, 604, 395/603; 707/3, 4, 5, 1, 7

[56] References Cited

U.S. PATENT DOCUMENTS

| | | | |
|---|---|---|---|
| 5,263,159 | 11/1993 | Mitsui | 395/605 |
| 5,278,980 | 1/1994 | Pedersen et al. | 707/4 |
| 5,293,552 | 3/1994 | Aalbersberg | 395/605 |
| 5,442,778 | 8/1995 | Pedersen et al. | 395/605 |
| 5,483,650 | 1/1996 | Pedersen et al. | 395/602 |
| 5,519,608 | 5/1996 | Kupiec | 395/759 |
| 5,535,382 | 7/1996 | Ogawa | 395/605 |
| 5,544,049 | 8/1996 | Henderson et al. | 395/757 |
| 5,598,557 | 1/1997 | Doner et al. | 395/605 |
| 5,787,420 | 7/1998 | Tukey et al. | 707/5 |

*Primary Examiner*—Thomas G. Black
*Assistant Examiner*—Greta L. Robinson

[57] ABSTRACT

A method of automatically ordering the presentation of documents clusters generated from a ranked corpus of documents. First, the corpus is ordered into a plurality of clusters. Next, a rank is determined for each cluster based upon the rank of a document within that cluster. Afterward, the clusters are presented to a computer user in the order determined by their rank.

14 Claims, 5 Drawing Sheets

METHOD OF ORDERING DOCUMENT CLUSTERS GIVEN SOME KNOWLEDGE OF USER INTERESTS

FIELD OF THE INVENTION

The present invention relates to a method of document clustering. In particular, the present method relates to a method of logically ordering document clusters for presentation to a computer user given some indication of the user's interests.

BACKGROUND OF THE INVENTION

Until recently the conventional wisdom held that document clustering was not a useful information retrieval tool. Objections to document clustering included its slowness with large document corpora and its failure to appreciably improve retrieval. However, when used as an access tool in its own right, document clustering can be a powerful technique for browsing a large document corpus. Pedersen et al. describe such a document browsing technique in U.S. Pat. No. 5,442,778, entitled "Scatter-Gather: A Cluster-Based Method and Apparatus for Browsing Large Document Collections."

Using document clustering as its centerpiece, the Scatter-Gather method disclosed by Pedersen et al. enables information access for those with non-specific goals, who may not be familiar with the appropriate vocabulary for describing the topic of interest, or who are not looking for anything specific, as well as for those with specific interests. Scatter-Gather does so by scattering the documents of a corpus and then gathering them into clusters and presenting summaries of the clusters to the user. Given this initial ordering the user may select one or more clusters, whose documents become a new sub-corpus. Additionally, the user may add documents to, or eliminate documents from, this sub-corpus, as desired, to facilitate a well-specified search or browsing. The documents of this modified sub-corpus are again scattered and then gathered into new clusters. With each iteration, the number of documents in each cluster becomes smaller and more detailed.

FIG. 1 illustrates an exemplary presentation and ordering cluster summaries on a computer screen, which were generated for an initial scattering of a corpus consisting of the August 1990 articles provided by the New York Times News Service. The first line of each cluster summary includes the cluster number, the number of documents in the summary, and a number of partial typical titles of articles within the cluster. The second line of each cluster summary lists words frequent within the cluster. While useful, these cluster summaries are not as helpful as the table of contents of a conventional textbook because their order of presentation does not indicate any relationship or similarity between adjacent clusters.

As FIG. 1 illustrates, clusters need not be presented to the user for consideration one at a time. However, there are limitations to how many clusters can be presented at a single time on a computer screen. The limitations of display device dimensions and the user's short term memory determine an upper limit on how may clusters can be usefully presented at once. If the number of clusters at a particular stage of a particular search exceeds this upper limit, it is possible and often desirable to group those clusters into fewer super-clusters, replacing what would have been one search stage by two search stages.

SUMMARY OF THE INVENTION

A method of automatically ordering the presentation of documents clusters generated from a ranked corpus of documents will be described. First, the corpus is ordered into a plurality of clusters. Next, a rank is determined for each cluster based upon the rank of a document within that cluster. Afterward, the clusters are presented to a computer user in the order determined by their rank.

Another method of automatically ordering the presentation of document clusters will also be described. This method makes use of the response to a user supplied boolean constraint to determine the most logical order of cluster presentation. The method begins by identifying each document of the corpus that satisfies the user's constraint. Next, the corpus is ordered into a plurality of clusters. Finally, a score is generated for each cluster based upon the number of documents within the cluster that satisfy the constraint.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
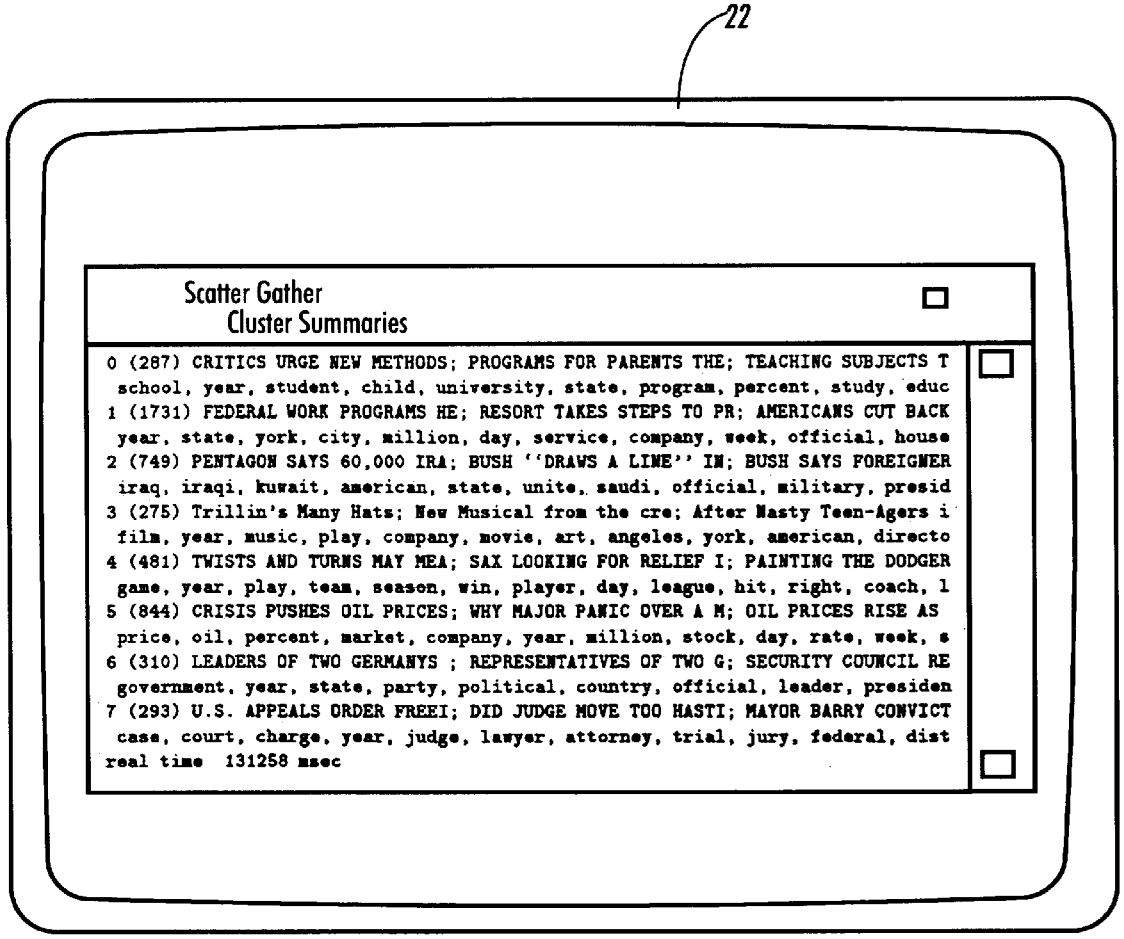
FIG. 1 illustrates a prior disorderly arrangement of cluster summaries for presentation.
Figure 2:
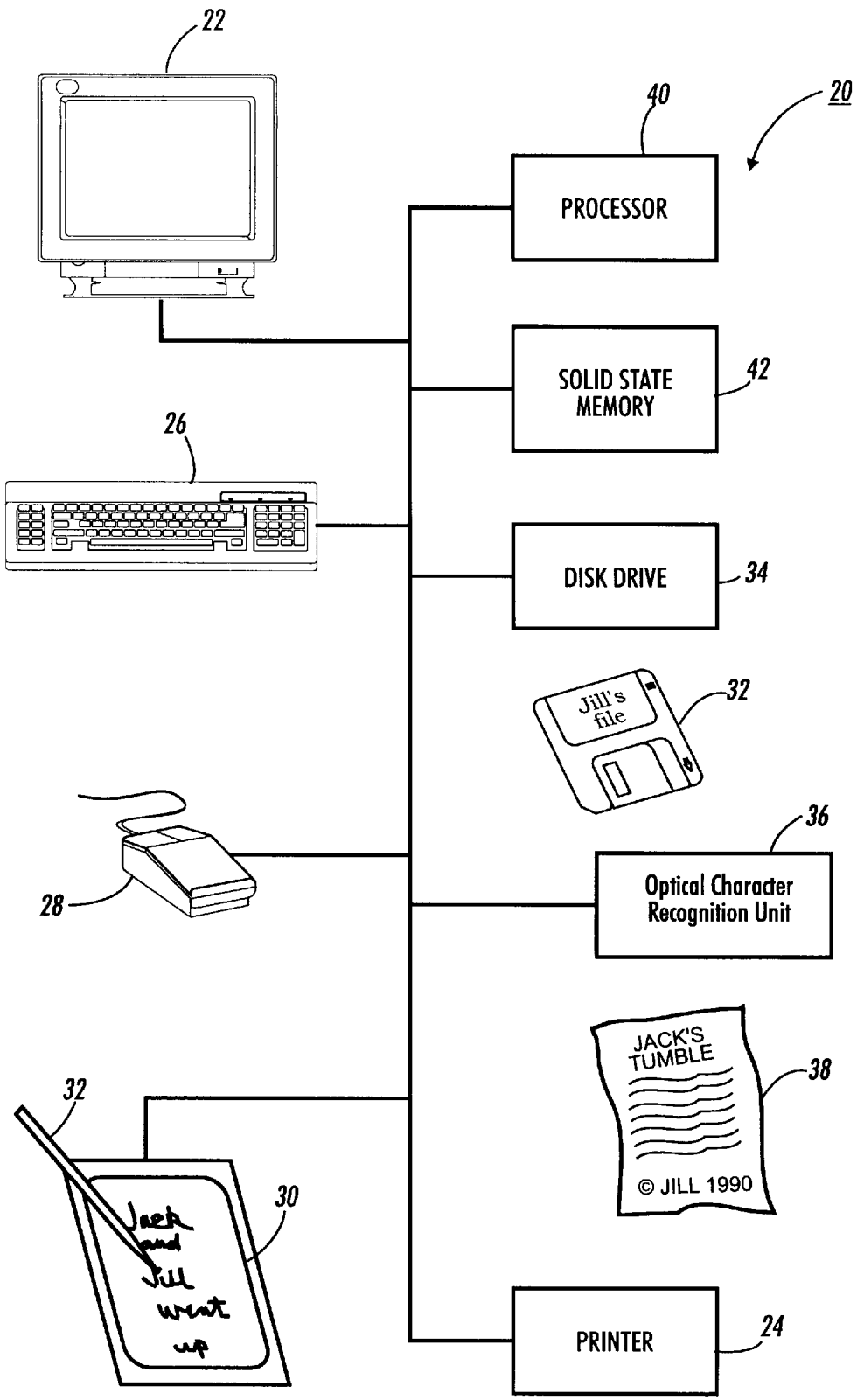
FIG. 2 illustrates a computer system for ordering document clusters for presentation.

FIG. 2 illustrates computer system 20, which incorporates the methods of the present invention for ordering document clusters for presentation. Briefly described, the methods of the present invention enable computer system 20 to automatically order document clusters for presentation to a computer user in a logical and useful fashion given some indication of the computer user's interests. Computer system 20 does so by ranking or scoring document clusters based on the user's perceived interests in documents within each cluster, and the clusters containing the most interesting documents are presented before those containing less interesting documents.

A. The Document Clustering Computer System

Prior to a more detailed discussion of the present invention, consider computer system 20. Computer system 20 includes monitor 22 for visually displaying information to a computer user. Computer system 20 also outputs information to the computer user via printer 24. Computer system 20 provides the computer user multiple avenues to input data. Keyboard 26 and mouse 28 allow the computer user to input data manually. The computer user may also input information by writing on electronic tablet 30 with pen 32. Alternately, the computer user can input data stored on machine readable media 32, such as a floppy disk, by inserting machine readable media into disk drive 34. Optical character recognition unit (OCR unit) 36 permits users to input hard copy natural language documents, like document 38, which it converts into a coded electronic representation, typically American National Standard Code for Information Interchange (ASCII).

Processor 40 controls and coordinates the operation of computer system 20 to execute the commands of the computer user. Processor 40 determines and takes the appropriate action in response to each command by executing instructions stored electronically in memory, either memory 42 or on floppy disk 32 within disk drive 34. Typically, operating instructions for processor 40 are stored in solid state memory 42, allowing frequent and rapid access to the instructions. Devices that can be used to implement memory 42 include standard, commercially available semiconductor logic devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. Document Clustering

The documents of a corpus must be clustered before the order of presentation of the clusters can be determined. The clusters at each stage of a search may have been precomputed, allowing their use in many other computer searches, or the clustering at each stage may be performed "on the fly." The most reasonable approach in many situations is to precompute the clusters for early stages and to compute the clusters in the later stages "on the fly."

This clustering may be done using a variety of techniques, including those described in U.S. Pat. No. 5,442,778 to Pedersen et al., which is incorporated herein by reference. Typically, clustering algorithms represent each document d of a corpus C using an appropriate lexicon, V. The appropriate lexicon will often utilize gentle stemming; i.e., words that differ by simple suffixes become a single term, and usually excludes words found on an extended list of stop words. As used herein, stop words are words that do little to change the topics of the sentences in which they appear. A suitable lexicon may also include selected word pairs and might differ from stage to stage of a search.

Some clustering algorithms use a countfile, c(d), to represent each document. In a countfile each scalar represents the number of times each term of the appropriate lexicon, V, occurs in document, d.

A countfile can be expressed:

$c(d) = \{f(\omega_i, d)\}$ for i=1 to $|V|$ where $\omega_i$ is the ith word in lexicon V; and $f(\omega_i, d)$ represents the frequency of the term $\omega_i$ in document d.

Figure 3:
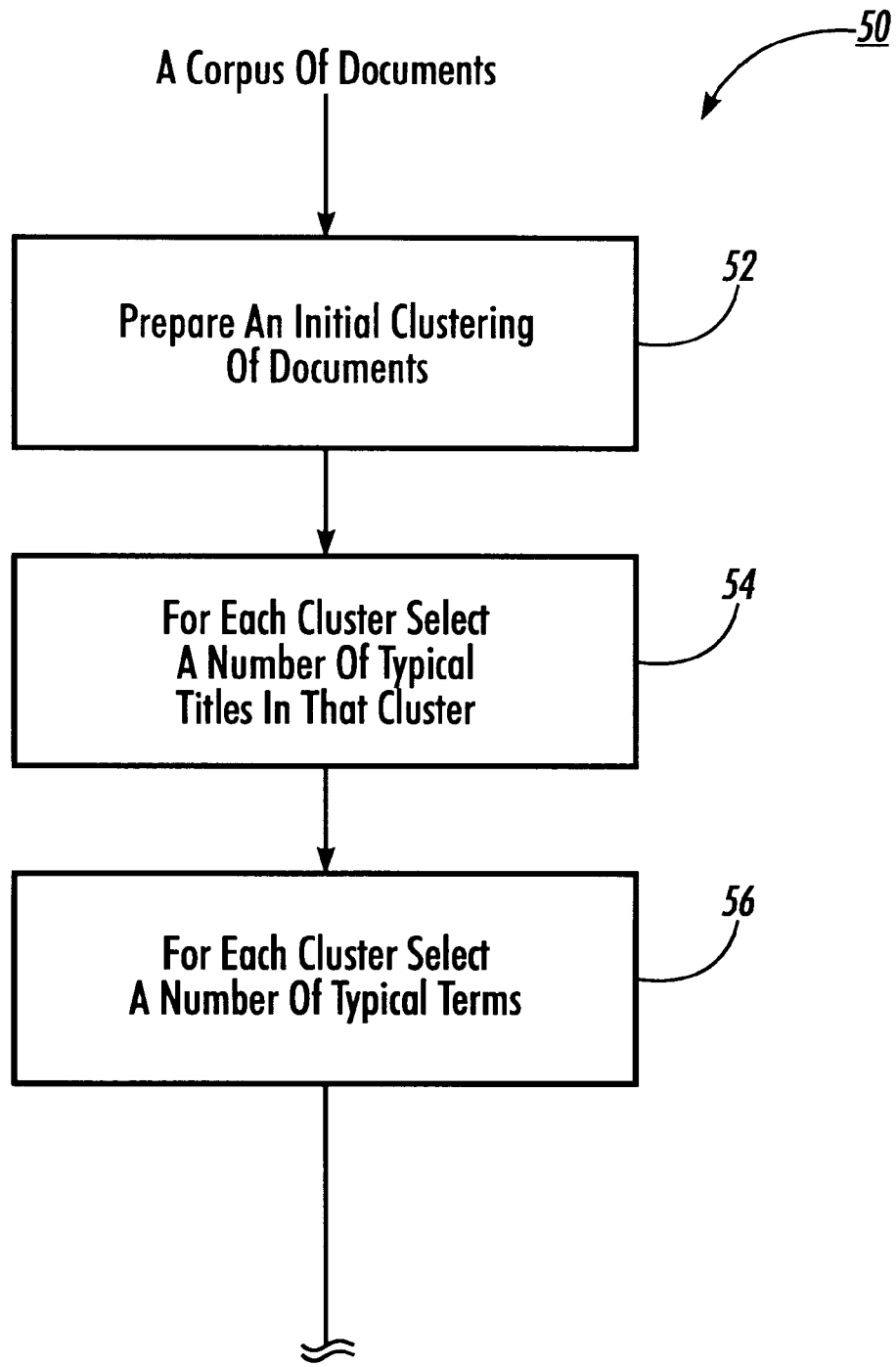
FIG. 3 illustrates a method of document clustering.

FIG. 3 illustrates the major tasks performed prior to presenting cluster summaries to a computer user. First, during step 52 a corpus of documents is ordered into a set of k initial clusters. That is to say, the documents of the corpus are organized into k groups. That done, attention turns to generating a summary for each cluster. Each cluster summary preferably includes a list of typical, or representative, partial document titles and list of frequent, or representative, terms. During step 54 processor 40 selects typical partial document titles for each document cluster. These partial titles may be selected in a number of ways. For example, titles can be selected based upon the proximity of their document's countfile c(d) to the cluster centroid, p. As used herein, a cluster centroid p is a vector in which each scalar represents the average number of occurrences within the cluster of each term $\omega$ of the lexicon V. Afterward, during step 56 typical terms are chosen to represent each cluster. Again, this can be done in a number of ways. One simple way is to select a number of the most frequently used terms within the documents of each cluster either by count, by a proportion of the total number of occurrences of each term in the lexicon that occurs in the cluster, or by a combination of these criteria. This information is easily derived given the countfiles and the words of the lexicon.

C. Cluster Ordering Given External Information

1. Cluster Ordering Based on Document Rank

Figure 4:
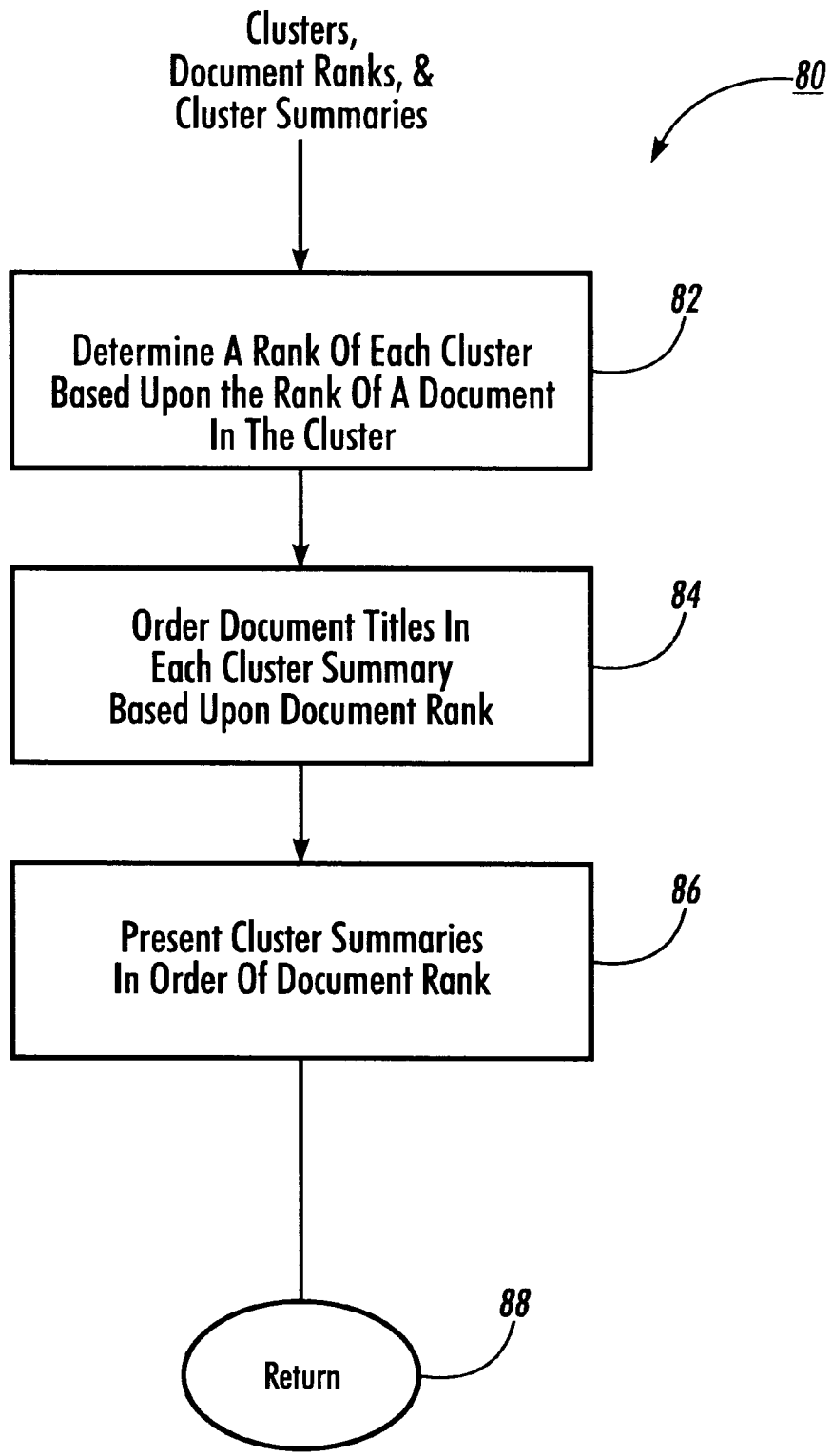
FIG. 4 illustrates a method of ordering document clusters for presentation when document rankings are provided.

FIG. 4 illustrates in flow diagram form the instructions 80 executed by processor 40 to determine a logical order to present cluster summaries when the documents of the corpus have been ranked, often with ties, on the basis of previous search histories, either those of the present user or by a member of a group whose interests are believed to be similar to that of the present user. This ranking may reflect accumulated data on documents finally selected in earlier searches. Alternatively, the ranking may reflect the scoring inherent in a similarity search. (See G. Salton and M. J. McGill, "Introduction to Modern Information Retrieval", McGraw-Hill, 1983, for a discussion of similarity searches.)

Instructions 80 determine an order of presentation given a prior user query, which is used as an indication of the computer user's interests. Briefly described, instructions 80 determine the order of cluster presentation using document rank to determine a cluster rank. Ties between ranked cluster may be broken by eating the tied clusters in the manner discussed previously with respect to FIG. 4 and instructions 60. Cluster summaries are then presented to the computer user in the resulting rank order. Instructions 80 may be stored in solid state memory 42 or on a floppy disk placed in disk drive 34. Instructions may be realized in any computer language including, LISP and C++.

Execution of instructions 80 is initiated upon receipt of a ranked, tie-broken, and clustered document corpus. Processor 40 responds to initiation by advancing to step 82. During step 82 processor 40 determines a rank for each cluster based upon the rank of a document d within that cluster. In one embodiment, the rank r of cluster $C_i$ is equal to the rank of the cluster's most desirable document r(d). That is to say, if low rankings are defined as desirable, then the rank of the cluster will be set to that of the cluster's lowest ranking document. Stated mathematically:

$r(C_i) = \min r(d)$ where $d \in C_i$.

Alternatively, other methods can be used during step 82 to determine cluster rank. For example, cluster rank can be set equal to the median document rank of a cluster, the average document rank, or equal to the total rank of a subset of the lowest ranking documents in the cluster; e.g. the ten lowest ranking documents, or the eighth or ninth lowest ranking documents.

Alternatively, other information can be used to rank clusters directly. Such information includes knowledge of the frequency of choices among the particular set of clusters being processed, or, more often, knowledge of choices by groups of similarly interested users. Again, ties between ranked clusters can be broken using the method described previously with respect to FIG. 4 and instructions 60.

Alternatively during step 84 the summary of each cluster can be modified by replacing the partial titles that make up part of the summary with an equal number of partial titles from the documents in the cluster that have the lowest ranks. Ties between documents having the same rank can be broken in the manner previously discussed. As before, the partial titles of documents with lower ranks are presented before those with higher ranks. Processor 40 then branches from step 84 to step 86.

Having determined the order of presentation of partial titles within each summary during step 84, processor 40 advances to step 86. During that step processor 40 presents the cluster summaries in cluster rank order. The document summaries may be presented to the user via monitor 22, printer 24 and/or stored to solid state memory 42 for later display. Cluster presentation complete, processor 40 branches from step 86 to step 88, returning control to the routine that called instructions 80.

2. Cluster Ordering Based on Binary Document Scores

Figure 5:
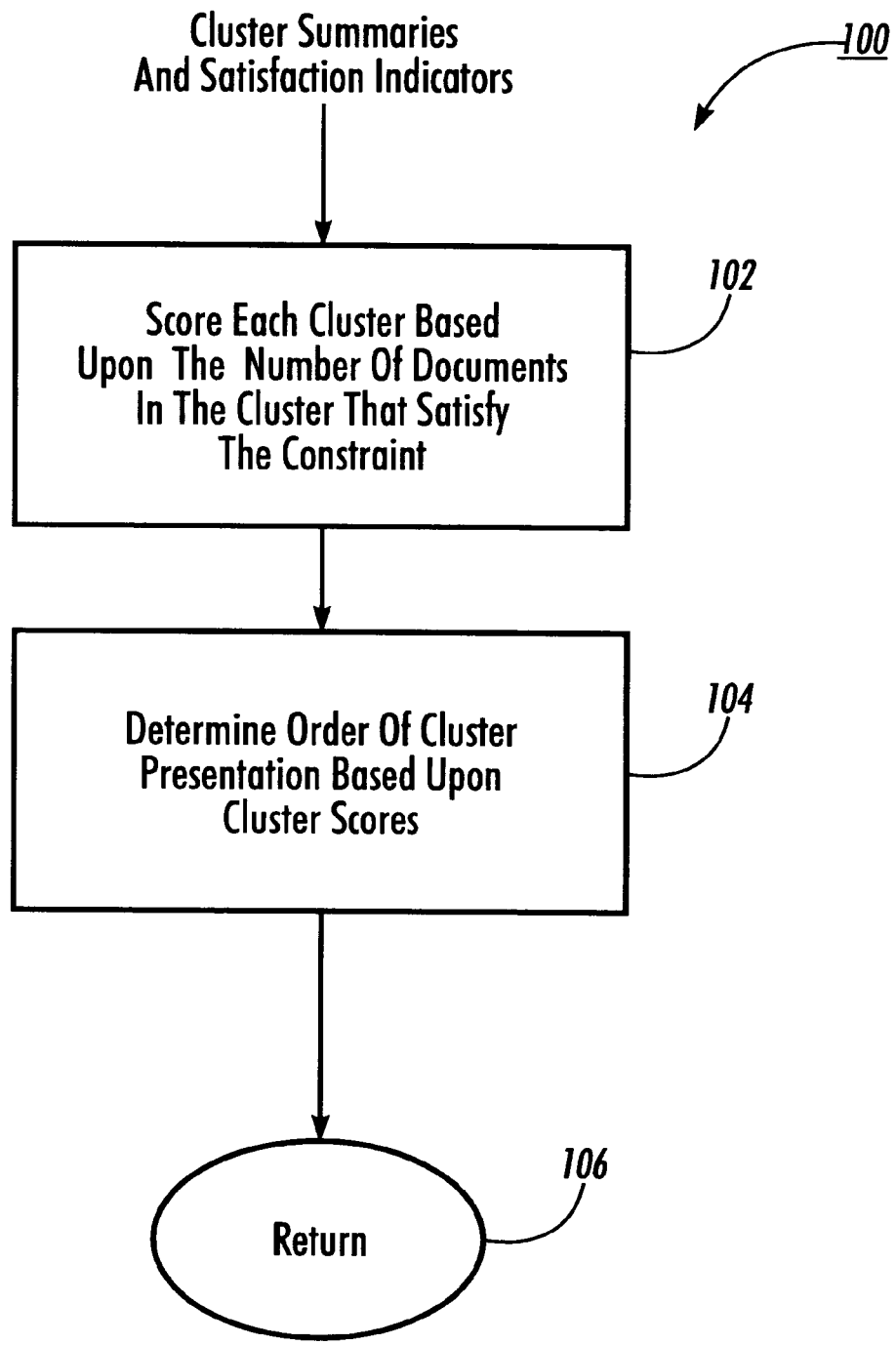
FIG. 5 illustrates a method of ordering document clusters for presentation when document satisfaction indicators are available.

FIG. 5 illustrates in flow diagram form the instructions 100 executed by processor 40 to determine an order to present cluster summaries when a boolean constraint, preferably structured as a combination of partial constraints, has been furnished for the document corpus by the computer user. That is to say, instructions 100 treat satisfaction of the boolean constraint as an indication of the computer user's interest in a particular document, which is then used to order the document clusters for presentation. Instructions 100 may be stored in solid state memory 42 or on a floppy disk placed in disk drive 34. Instructions may be realized in any computer language including, LISP and C++.

Execution of instructions 100 is initiated upon receipt of a clustered document corpus, and satisfaction indicators, I(d), which indicate for each document whether that document satisfies the user's boolean constraint. Processor 40 responds to initiation by advancing to step 102.

During step 102 processor 40 calculates a score for each cluster based upon the number of documents with the cluster that satisfy the boolean constraint. Processor 40 can score each document based upon total or partial satisfaction of the boolean constraint. How to chose among these methods of scoring will be discussed following the discussion of the methods.

a. Scoring Based on Total Satisfaction

If when a document d satisfies the computer user's boolean constraint $I(d)=1$, and if $I(d)=0$ when document d does not satisfy the boolean constraint, then the score s for a cluster $C_i$ can be calculated in a number of ways. In one embodiment, the cluster score is the sum of satisfaction indicators for that cluster. Stated mathematically:

$s(C_i) = \Sigma I(d)$ where $d \in C_i$.

In yet another embodiment, the cluster score can be calculated as the sum of satisfaction indicators divided by the number of documents in the cluster. Stated mathematically:

$s(C_i) = \epsilon I(d)/|C_i|$ where $|C_i|$ is the number of documents in cluster $C_i$.

In a third embodiment cluster scores can be taken as the product of the two scores previously discussed above.

b. Scoring Based on Partial Satisfaction

Alternatively, clusters can be scored during step 102 based on partial satisfaction of the boolean constraint. This permits the clusters to be scored even if none, or very few of the clusters, satisfy the overall constraint, e.g., when the total number of satisfactions among all documents is 25 or less. In these situations it may be important to recognize that a cluster in which each partial constraint is satisfied for some documents is likely to contain a desired document even when no one document meets the overall constraint. Implementing this alternative requires a breakdown of the boolean constraint such that satisfaction of the overall constraint is equivalent to simultaneous satisfaction of multiple partial constraints. If h specifies a partial constraint, a corresponding partial satisfaction indicator $I_h(d)$ and a partial cluster score can be defined for each h exactly as discussed above.

c. Choosing a Method of Scoring

To determine which method of scoring clusters should be used during step 102 we use a dissected satisfaction score combining the scores for each partial constraint. This dissected score is the minimum number of documents within a cluster satisfying all constraints h. Clearly, the dissected satisfaction score is greater than or equal to the corresponding total satisfaction score. The method of scoring can be chosen based upon comparison of the total number of satisfactions in all clusters combined compared to some threshold value. In this embodiment, when the total number of total satisfactions is greater than or equal to this threshold then total satisfaction is used to score and order the clusters being processed. Analogously, when the total number of total satisfactions is less than the threshold value then the scoring and ordering of clusters is based upon dissected satisfaction scores. In this embodiment the value to which the threshold is set is a design choice. The value of the threshold may be set so high in some embodiments that the dissected satisfaction score is always used.

An analogous method can be used to select between the two types of scoring when the computer user specifies the overall boolean constraint as two nested dissections, in which the finer dissection dissects the partial constraint of the broader one. In these circumstances two thresholds would be used in an entirely analogous way so that the total satisfaction score, first dissected score and second dissected score might be used, in turn, during successive stages of a single search.

Having scored all the clusters, however scored, processor 40 branches from step 102 to step 104. During step 104 processor 40 uses the cluster scores previously generated to determine the order of cluster presentation and then presents the cluster summaries in that order. Processor 40 presents first the cluster including the greatest number of documents satisfying the boolean constraint, next the cluster including the second greatest number of documents satisfying the boolean constraint, and so on. The document summaries may be presented via monitor 22, printer 24 and/or stored to solid state memory 42 for later display. Cluster presentation complete, processor 40 branches from step 104 to step 106, returning control to the routine that called instructions 100.

D. Conclusion

Thus, two different methods have been described for determining cluster ordering for presentation to a computer user in a way that emphasizes topic similarity. These methods use available information about the computer user's interests to generate a cluster score or ranking, which is then used to contribute to a determination of the order of cluster presentation.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of browsing a corpus of documents, each document of the corpus having a rank generated in response to a query of a computer user, the method using a processor executing instructions stored in a memory the method comprising the steps of:

a) ordering the corpus into a plurality of clusters, each cluster including at least one document;
   b) determining a rank of each cluster based upon the rank of a one of the documents in the cluster; and
   c) presenting the clusters to the computer user in an order based upon cluster rank.

2. The method of claim 1 further comprising the step of:

d) generating a cluster summary for each document cluster, each cluster summary a number of typical partial titles of documents within the cluster, the documents represented being selected based upon document rank.

3. The method of claim 1 wherein step c) includes presenting higher ranking document clusters prior to lower ranking document clusters.

4. The method of claim 1 wherein step c) includes presenting lower ranking document cluster prior to higher ranking document clusters.

5. The method of claim 1 wherein step b) includes generating a rank $r(C_i)$ for each document cluster $C_i$ according to the equation:

$$r(C_i) = \min r(d)$$

where: d is a document within cluster $C_i$; and
$r(d)$ is the rank of document d.

6. The method of claim 2 wherein step c) includes presenting higher ranking document clusters prior to lower ranking document clusters.

7. The method of claim 6 wherein step b) includes generating a rank $r(C_i)$ for each document cluster $C_i$ according to the equation:

$$r(C_i) = \max r(d)$$

where: d is a document within cluster $C_i$
$r(d)$ is the rank of document d.

8. The method of claim 2 wherein step c) includes presenting lower ranking document cluster prior to higher ranking document clusters.

9. The method of claim 8 wherein step b) includes generating a rank $r(C_i)$ for each document cluster $C_i$ according to the equation:

$$r(C_i) = \min r(d)$$

where: d is a document within cluster $C_i$
$r(d)$ is the rank of document d.

10. A product of manufacture comprising:
    a) a memory; and
    b) instructions stored in the memory for a method of browsing a corpus of documents, each document of the corpus having a rank generated in response to a query of a computer user, the method using a processor executing instructions stored in a memory, the method including the steps of:
        1) ordering the corpus into a plurality of clusters, each cluster including at least one document;
        2) determining a rank of each cluster based upon the rank of a one of the documents in the cluster; and
        3) presenting the cluster to the computer user in an order based upon cluster rank.

11. A method of browsing a corpus of documents using a processor and a memory coupled to the processor, the processor implementing the method by executing instructions stored in the memory, the method comprising the steps of:
    a) identifying each document of the corpus that satisfies a constraint supplied by a user of the computer;
    b) ordering the corpus into a plurality of clusters, each cluster including at least one document;
    c) determining a score for each cluster based upon how many documents in the cluster satisfy the constraint; and
    d) presenting the clusters to the computer user based upon cluster scores.

12. The method of claim 11 wherein step c) comprises the steps of:
    e) determining a number of documents in each cluster that satisfy the constraint;
    f) setting each cluster score equal to the number of documents in the cluster that satisfy the constraint.

13. The method of claim 11 wherein step c) comprises the steps of:
    a) determining a first number of documents in each cluster that satisfy the constraint;
    b) determining a second number of documents in each cluster; and
    c) setting the score of each cluster proportional to the first number and inversely proportional to the second number.

14. A product of manufacture comprising:
    a) a memory; and
    b) instructions stored in the memory, the instructions representing a method of browsing a corpus of documents using a processor coupled to the memory, the method comprising the steps of:
        1) identifying each document of the corpus that satisfies a constraint supplied by a user of the computer;
        2) ordering the corpus into a plurality of clusters, each cluster including at least one document;
        3) determining a score for each cluster based upon how many documents in the cluster satisfy the constraint; and
        4) presenting the clusters to the computer user based upon cluster scores.

* * * * *